United States Patent

[11] 3,615,699

[72] Inventor Justin Melvin Mickevicz
    Chicago, Ill.
[21] Appl. No. 495,389
[22] Filed Oct. 13, 1965
[45] Patented Oct. 26, 1971
[73] Assignee Pro-Col Corporation
    Chicago, Ill.
    Continuation-in-part of application Ser. No. 428,615, Jan. 28, 1965, now abandoned, Continuation-in-part of application Ser. No. 241,825, Dec. 3, 1962, now abandoned.

[54] PREPARATION OF FREE-FLOWING BROWN SUGAR COMPOSITION
    2 Claims, 4 Drawing Figs.
[52] U.S. Cl. .................................................. 99/141, 127/30, 127/63
[51] Int. Cl. .................................................. C13f 3/00
[50] Field of Search .......................................... 99/141, 6; 127/63, 30; 117/100; 252/381, 383, 384, 385

[56]                References Cited
            UNITED STATES PATENTS
1,021,477  3/1912   Raisin ..................  99/6 X
1,995,519  3/1935   Reiner .................   99/6
2,225,894  12/1940  White ..................  99/141 X
2,430,797  11/1947  Zenzes ................   99/204
2,846,311  8/1958   Rosner ................  99/141 X
3,023,104  2/1962   Battista ...............   99/1
3,078,164  2/1963   DeLisle ...............   99/6 X
3,085,944  4/1963   Valentine .............  252/385 X

Primary Examiner—Joseph M. Golian
Attorney—Charles B. Cannon

ABSTRACT: Free-flowing brown sugar which retains its normal moisture content is prepared by (1) diffusing both (a) brown sugar and (b) finely divided wood cellulose, microcrystalline cellulose or sugar cane cellulose and (2) commingling these materials in their diffused condition without subjecting the mixture to any substantial degree of pressure. Flavoring fats or oils may be incorporated in the previously formed mixture.

PREPARATION OF FREE-FLOWING BROWN SUGAR COMPOSITION

This application is a continuation-in-part of applicant's copending application, Ser. No. 428,615, filed Jan. 28, 1965 which, in turn, was a continuation-in-part of applicant's earlier application, Ser. No. 241,825, filed Dec. 3, 1962 and which said application 428,615 was a consolidation of aforesaid application Ser. No. 241,825 and earlier applications 275,242 filed Apr. 24, 1963 and Ser. No. 296,384, filed July X 19, 1963, all of which are now abandoned.

This invention relates to edible food products and a method for preparing the same.

This invention relates to brown or so-called "soft" sugar products and to a method for preparing such brown sugar products including both light and dark brown sugar products to the end that they will not cake or lump up or become crusty upon standing in packaged or bagged form or in drums, when intended for commercial use, or during reasonable shelf life when used in consumer product packages, and so that such brown sugar products will not adhere to and build up on the working parts of food mixing and blending apparatus, and the like, in use.

The present invention is particularly applicable to tacky so-called brown or so-called "soft" sugars which are extensively used in the baking and confectionery industries. Thus, so-called brown or "soft" sugars, due to their characteristic flavor, are useful in making fudges and other confectionery frostings, icings and cake mixes, cookie mixes and other bakery goods, and for other purposes where the flavor of brown sugar is desirable.

Brown or so-called "soft" sugar commonly consists of a mass of fine sugar crystals, covered with a film of dark colored, cane-flavored syrup which imparts to the sugar its characteristic color and flavor. Such so-called brown or "soft" sugars are produced commercially in a number of grades which vary in color from so-called No. 1 brown sugar, which is virtually white in color, through yellow and brown sugars which become progressively darker, ending with a very dark brown sugar which is known in the trade as No. 15. However, in the trade, Nos. 6, 8, 10 and 13 are the most commonly produced and used forms of so-called brown or so-called "soft" sugars. The sugar content in such so-called brown or "soft" sugars varies from about 95 percent in No. 6, to about 91 percent in No. 13, and the moisture content of such "soft" or brown sugars ranges from about 2 percent to about 4 percent, or comparable sugar moisture contents in brown sugars otherwise identified.

However, one of the primary problems heretofore encountered in the use of such tacky brown or so-called "soft" sugars is the fact that they tend to agglomerate or cake or form lumps, or to become crusty upon standing in bagged or packaged form, or in drums, or like containers. This lumping or caking or becoming crusty is believed to be due, in part, to the fact that the crystals of brown sugar are normally covered with a film of sticky flavoring syrup. In the case of brown sugar derived from cane sugar this syrup originates in the sugar cane and in the case of brown sugar derived from beet sugar it is imparted to the beet sugar crystals by spraying a molasseslike syrup thereon to produce a brown type of sugar product. It has been found that this system of crystals and syrup transfers moisture very readily and that when in a moist atmosphere the sugar mass is in a plastic state, that is, the flavoring syrup surrounding the crystals allows the crystals to move about in the flavoring syrup as a vehicle. However, in a dry atmosphere the flavoring syrup gives up some of its moisture and becomes hard and thus reduces the ability of the crystals to move with the result that the brown sugar lumps or cakes or becomes crusty, although when moisture is restored to the brown sugar the lumps or "cakes" or crusty areas again become plastic or soft.

In any event, the crystals of brown or so-called "soft" sugar tend to agglomerate upon standing in bags, packages, drums, or other containers, and to form hard lumps which present a serious problem in the use of the brown or so-called "soft" sugar in food mixing and blending equipment and also when such brown sugars are stored in small consumer packages for sale in grocery stores and like places.

In addition, the phenomena related to the tackinesss of the brown sugar causes it to adhere to and build up upon the working parts of food mixing and blending apparatus with the result that eventually the brown sugar builds up to a point where it must be mechanically chipped off or steamed off from such food mixing and blending equipment and the like. Moreover, as the brown sugar builds up in the moving parts of the food mixing or blending equipment it causes heat, due to the increased friction resulting from the build up of the brown sugar in the working parts of the equipment, and this further dries out the brown sugar and causes further lumping or caking of the brown sugar with the result that this condition continues until the drag upon the driving means in the food mixing or blending equipment becomes very severe and frequently stops the operation of the equipment.

Accordingly, an object of the present invention is to provide a new and improved method of making a brown sugar product having an edible bond and tack-reducing agent, or a mixture of such agents, incorporated therein such a manner that the foregoing and other difficulties experienced in the use of commercial mixers presently available are overcome and the edible bond and tack-reducing agent is intimately and thoroughly mixed with the brown sugar component without subjecting the mixture of the tacky brown sugar component and of the edible finely divided bond and tack-reducing component to any substantial degree of pressure, with the result that in the new brown sugar product the relatively light finely divided edible bond and tack-reducing agent is intimately and thoroughly mixed with the brown sugar particles without compacting or tendency to roll up and form lumps.

Further objects of the invention are: (a) to provide a new and improved method of making the new brown sugar product which enables the relatively lighter edible bond and tack-reducing component thereof to be intimately mixed with the relatively heavier brown sugar component in such a manner that the particles of the edible bond and tack-reducing agent are so commingled with the particles of the brown sugar component as to more nearly completely envelop the particles of the brown sugar component and thereby impart a maximum surface area of the particles of the brown sugar component which are covered by the particles of the edible bond and tack-reducing agent and thus impart the maximum functional effect to the latter; (b) to provide a new and improved method for making the new brown sugar product which requires relatively smaller quantities of the edible bond and tack-reducing agent component to the end that the percentage of the edible bond and tack-reducing agent component required for incorporation in or with the brown sugar component is materially reduced, thereby enabling the use of edible bond and tack-reducing agents which it has not been possible to use heretofore; (c) to provide a method of making the new brown sugar product which generates little heat or friction during the operation of mixing the brown sugar and the edible bond and tack-reducing component thereof; (d) to provide a method of making the new brown sugar product which develops very little shear in the system during the mixing operation; (e) to provide a method which develops very little smear during the mixing of the brown sugar component or mixtures thereof, and the edible bond and tack-reducing component and thus minimizes the necessity for washing the mixing equipment; (f) to provide a method which develops relatively little pressure between the two phases or components employed in he new method during the operation of mixing them together; (g) to provide a method which avoids "pilling" or balling up of the components of the mixture as is caused by the twisting motion involved in the use of other methods of making brown sugar products; (h) to provide a method which allows for aeration of the components of the new brown sugar product during the mixing operation; (i) to provide a method which facilitates or enables the spraying or adding of flavoring or like additives into or with the components of the mixture in addition to the edible bond and tack-reducing agent during the mixing operation, as may be necessary or desirable; (j) to provide a method which may be carried out in an atmosphere of relatively high or low temperature or relatively high or low humidity and either under vacuum or under pressure; (k) to provide a free-flowing brown sugar product which retains the natural moisture content and flavor of the brown sugar component used in making the new brown sugar product and which does not, therefore, require drying of the brown sugar product for the removal and/or reduction of the natural moisture content of the brown sugar component with the result that the new brown sugar products retain the natural flavor, color and aroma of the brown sugar component.

Another object of the present invention is to provide a new and improved brown or so-called "soft" sugar product and a new and improved method for preparing the same in such a manner that the tack or tackiness and the bond of the brown or so-called"soft" sugar is substantially reduced and so that the new brown or so-called "soft" sugar product will not agglomerate or form lumps or cake or become crusty upon standing in packaged or bagged form or, in drums, or during shelf life, and so that it will likewise not build up upon the working parts of food mixing and blending equipment and the like, in use. This latter phenomenon is known in the art as "-smearing" or "gunking up."

An additional object of the invention is to provide a new and improved brown or so-called "soft" sugar product which may be packaged, bagged or stored in drums or other containers without agglomerating, smearing, forming lumps, caking, or becoming crusty.

A further object of the present invention is to provide a new and improved method for incorporating and intimately mixing an edible bond and tack-reducing agent with a so-called brown or "soft" sugar to provide the new brown sugar product herein referred to.

Still another object of the present invention is to provide a new and improved method for incorporating an edible bond and tack-reducing agent with a so-called brown or soft sugar in such a manner that the relative quantity or percentage of the edible bond and tack-reducing agent, in relation to the percentage of the so-called brown or "soft" sugar component of the completed product, is materially reduced, thereby making it possible to effect a distinct economy in the manufacture of the new brown sugar product while, at the same time, enabling the new brown sugar product to retain substantially the same characteristics as the brown sugar component thereof as to taste or sweetness, cooking and baking characteristics, and the like.

In the practice of the present invention, I have found that a new and useful brown or so-called "soft" sugar product may be prepared by the novel method of the resent invention by incorporating in and intimately mixing with any of the available types of brown or so-called "soft" sugars herein referred to a material which significantly reduces the tack or tackiness and the bond of the brown or so-called "soft" sugar to such an extent that it will not agglomerate, form lumps, cake or become crusty when stored in any type of container and will not significantly smear or build up on the working parts of food mixing or blending equipment in use.

Edible bond and tack-reducing agents of the character employed in the practice of the resent invention are relatively light in density and when they are commingled with a relatively heavy product, namely, a light or dark brown sugar, of the character herein referred to, there is a tendency for the edible bond and tack-reducing agent to roll up or wad up and to diffuse in a very nonuniform manner in the sugar mass.

Moreover, due to the natural tackiness of brown sugars the incorporation of edible bond and tack-reducing agents therein presents additional distinct problems and among these are the fact that the customary mixers used in connection with brown sugars, and in the manufacture of products employing brown sugars, namely, mixers of the egg beater type, or mixers of the ribbon type, such as so-called ribbon blenders, or mixers of the screw type, such as screw mixers embodying tubes, troughs, or cones, or dough mixers, or revolving or stationary drums with plows and/or choppers therein, all present a serious drawback in that they generate substantial quantities of heat which tends to cause the brown sugar to smear excessively. Moreover, the use of such mixers tends to cause the relatively lighter edible tack and bond-reducing agent to become poorly distributed or "lost" in the tacky brown sugar mass.

An additional object of the present invention is to provide a new and improved method of making brown sugar products, and new and improved brown sugar products having a new and improved finely divided edible bond and tack-reducing agent or additive incorporated therein in the form of an edible finely divided water-insoluble cellulose, known as BW 200 Cellulose or, reasonable microcrystalline cellulose, sugar cane cellulose, or mixtures of the other finely divided edible bond and tack-reducing agents referred to above.

In one phase of the present invention, I have found that one of the new bond and tack-reducing agents, such as recovered from sugar cane, has certain desirable advantages and characteristics, including the fact that when it is used with so-called brown or soft sugars, prepared from the sugar cane, the entire brown sugar product may thus be prepared from sugar cane, a natural food-producing product, and hence tends to minimize the problems as involved in the use of some other additives in food products certain of which require special consideration or governmental approval.

All of the foregoing and other difficulties are overcome in the practice of the present invention, as will be pointed out hereinafter.

The drawings show schematically typical apparatus and illustrate typical methods which may be employed in the practice of the present invention for incorporating the relatively light edible bond and tack-reducing agent in and mixing it with the brown sugar component although many variations of such apparatus and methods may be employed within the scope and contemplation of the present invention.

In the practice of the present invention I may employ any light or dark brown sugar, as supplied by commercial sugar refineries, first breaking up or removing lumps which are found in such brown sugars, as received from the refinery, by means of an arrangement of vertical screens activated by a vibrator or a precrusher or by means of a scroll. This method of eliminating the lumps found in commercial brown sugars makes the sugar more uniform and provides the brown sugar component employed in making the new brown sugar product in the practice of one phase of the present invention, and in accordance with certain of the following examples.

In the following examples the brown sugar component referred to is brown sugar as received in bags from the refiner, but it is to be understood that certain variations would be made in practicing this phase of the invention in a sugar refinery where the brown sugar component would be available in bulk form.

In the practice o the present invention, I have found that in order to obtain the maximum efficiency of the additive, that is, the edible tack and bond-reducing agent or agents, in relation to the brown sugar component of the new brown sugar product, and to obtain the maximum surface area coverage of the brown sugar particles by or from the additive it is necessary that both the brown sugar particles and the particles of the additive be diffused, with sifting, if desired, and then commingled in their diffused state or condition, followed by packaging, or the like, as desired.

Thus, in the practice of one phase of the resent invention one of the new brown sugar products may be prepared in accordance with the following examples:

EXAMPLE NO. 1

Figure 1:
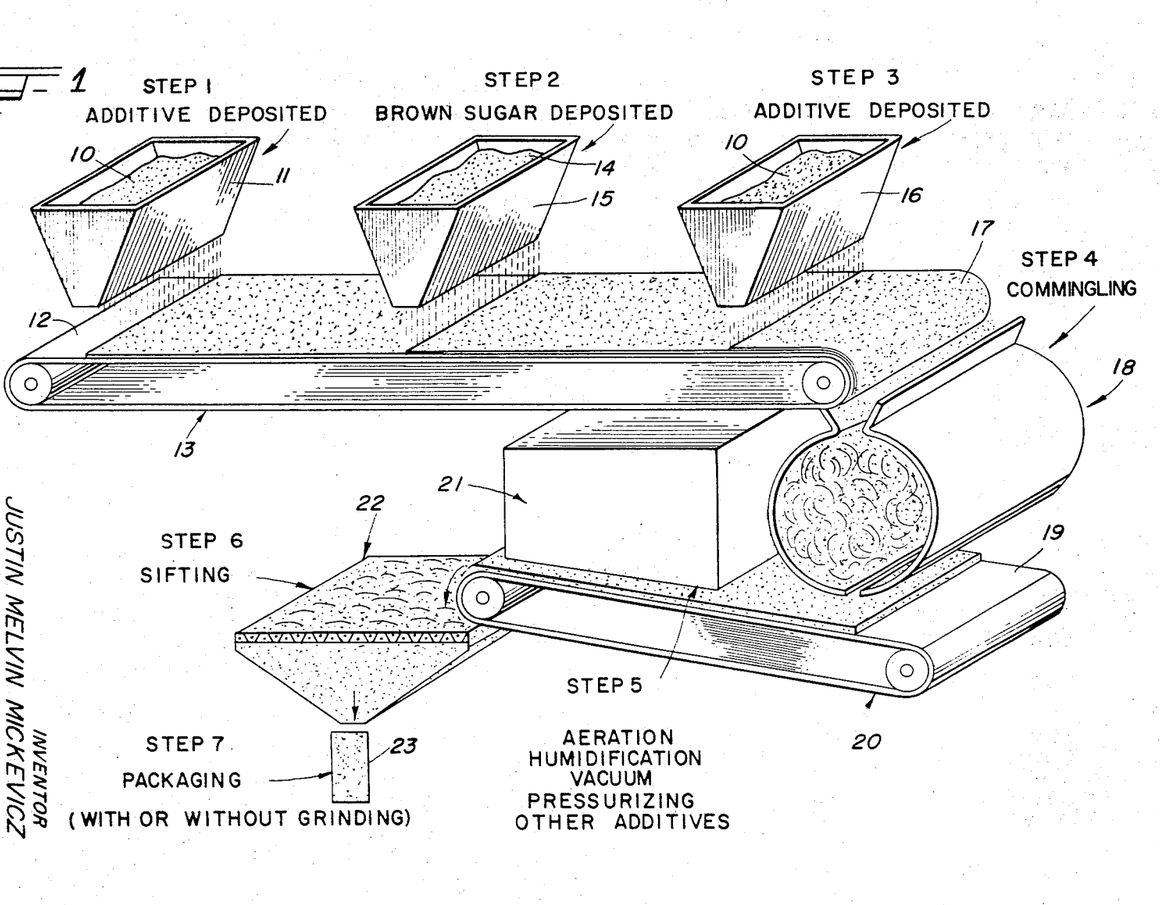
FIG. 1 is a schematic illustration of one form of a typical apparatus and method which may be employed in the practice of the present invention.

Twenty pounds of DOMINO No. 13 dark brown sugar are worked through a one-half inch mesh screen for the purpose of prebreaking the product. Thus, referring to FIG. 1 of the drawings, 1 pound of a finely divided edible bond and tack-reducing agent or additive 10 in the form of an edible finely divided water-insoluable cellulose, known as SOLKA-FLOC BW 200 cellulose equal to 5 percent of the weight of the dark brown sugar component, may be employed with the apparatus shown in FIG. 1, for example, and in this instance is divided and one-half pound thereof is placed in each of two suitable hoppers, or like dispensing containers 11 and 16, as illustrated in FIG. 1 of the drawings, from which it is spread by gravity, or otherwise, (step 1), upon the upper run 12 of a moving endless conveyor 13. The brown sugar component 14, treated as above, to eliminate lumps, is placed in a suitable hopper, or like dispensing container or scroll 14, from which it is deposited (at step 2) by gravity or otherwise upon the additive 10 from the dispensing hopper 11, and is diffused upon the additive 10, as the additive travels with and upon the upper run 12 of the endless conveyor 13 and is diffused thereon. The diffused layer of edible bond and tack-reducing agent, 10, having thereon a layer of the brown sugar component 14, is carried forward under a third dispensing hopper 16 from which another layer of the edible bond and tack-reducing agent 10 is deposited (at step 3) by gravity, or otherwise, upon the diffused mixture of the additive 10 and brown sugar component 14. The diffused mixture 17 thus prepared then travels from the upper run 12 of the endless conveyor 13 to a suitable diffusion or commingling device, generally indicated at 18, onto the upper run 19 of a second and lower endless conveyor 20, and thence to a treating station generally indicated at 21, where it may be subjected to any one or more of several optional treatments such as aeration, humidification, vacuum or pressurizing, and incorporation of other additives, (step 5, FIG. 1). If desired, this process may be repeated one or more times. The diffused and commingled mixture 17 thus treated, is then directed into a sifting unit 22, where it is sifted, whereupon the thus prepared end brown sugar product may be directed by gravity, or otherwise, from the sifting unit 22 into a suitable packaging unit 23 for packaging, as desired.

In place of the DOMINO brown sugar (dark or light) referred to in example No. 1, an equal quantity of brown sugar (dark or light) may be employed with similar results or comparable brown sugars.

If desired, steps Nos. 1, 2 and 3 may be varied as, for example, by depositing the brown sugar component on the conveyor at step 1, then depositing the additive at step 2, and then depositing additional brown sugar at step 3, or various other modifications of these steps may be employed, if desired.

It will thus be noted that in the practice of the present invention, which is set forth in the foregoing example No. 1, that the brown sugar component and the edible bond and tack-reducing agent are first diffused, in the absence of any significant pressure, as they are fed from the hoppers 15 and 11 and 16, respectively, onto the upper run 12 of the endless conveyor 13, where they are partially commingled, and that the commingling action is completed as the mixture 17 is advanced through the tumbling or commingling unit 18 into the upper run 19 of the endless conveyor 20, after which the thus diffused and commingled mixture may be packaged at the packaging station 23. Thus, it has been found in the practice of the present invention, described above, that the carrying out of the successive steps of first diffusing the brown sugar and additive components of the new brown sugar product, in the absence of any significant pressure, then commingling them, without subjecting them to any substantial degree of pressure, effects the maximum surface area contact between the brown sugar component and the edible bond and tack-reducing agent components and thus enables the edible bond and tack-reducing agent to accomplish its maximum efficiency. The same result may be effected by means of other and different apparatus, shown in FIGS. 2, 3 and 4 of the drawings, and which will be described hereinafter.

EXAMPLE NO. 2

The same procedure was followed as in example No. 1 except that in this instance there was employed 20 pounds of DOMINO light brown sugar No. 10 plus 0.8 pound, equal to 4 percent, by weight, of the dark brown sugar component, of the edible bond and tack-reducing agent, namely, BW 200 cellulose.

EXAMPLE NO. 3

The same procedure was followed as in example No. 1 except that in this instance there was employed 20 pounds of JACK FROST dark brown sugar plus 1.4 pound, equal to 7 percent, by weight, of the dark brown sugar component, of BW 200 cellulose.

EXAMPLE NO. 4

The same procedure was followed as in example No. 1 except that in this instance there was employed 20 pounds of HJACK FROST light brown sugar plus 1 pound, equal to 5 percent, by weight, of the light brown sugar component, of the edible bond and tack-reducing agent in the form of BW 200 cellulose.

EXAMPLE NO. 5

The same procedure was followed as in example No. 1 except that there was employed 20 pounds of dark C & H brown sugar plus 1.2 pound, equal to 6 percent, by weight, of the dark brown sugar component, of the edible bond and tack-reducing agent in the form of BW 200 cellulose.

EXAMPLE NO. 6

The same procedure was followed as in example No. 1 except that in this instance there was employed 20 pounds of light C & H brown sugar plus 1 pound, equal to 5 percent, by weight, of the light brown sugar component of an edible bond and tack-reducing agent in the form of BW 200 cellulose.

EXAMPLE NO. 7

The same procedure was followed as in example No. 1 except that in this instance there was employed 20 pounds of DOMINO dark No. 13 brown sugar plus 1 pound of an edible bond and tack-reducing agent in the form of BW 200 cellulose equal to 5 percent, by weight, of the dark brown sugar component.

EXAMPLE NO. 8

The same procedure was followed as in example No. 1 except that in this instance 20 pounds of dark brown sugar in the form of DOMINO dark brown No. 13 was stored in a refrigerator for a period of 3 months, whereupon it was removed from the refrigerator, at a temperature of 50° F, and immediately intimately mixed with 1 pound of BW 200 cellulose equal to 5 percent, by weight, of the dark brown sugar component.

EXAMPLE NO. 9

The same procedure was followed as in the foregoing example No. 1 except that in this instance 20 pounds of DOMINO No. 13 dark brown sugar were employed with an edible bond and tack-reducing agent in the form of 0.8 pound, equal to 4 percent, by weight, of the dark brown sugar component, in the form of BW 300 cellulose, which is a 300 mesh grind of this form of edible cellulose.

EXAMPLE NO. 10 No.

The same procedure was followed as in example No. 9 above, except that in this instance there was employed 0.6 pound of the additive or edible bond and tack-reducing agent, in the form of BW 300 cellulose, equal to 3 percent, by weight, of the dark brown sugar component.

EXAMPLE NO. 11

The same procedure was followed as in the foregoing example No. 9 above, except that in this instance there was employed 2 pounds of the additive or edible tack and bond-reducing agent, in the form of BW 300 cellulose equal to 10 percent, by weight, of the dark brown sugar component.

EXAMPLE NO. 12

The same procedure was followed as in the foregoing example No. 1 except that in this instance there was employed 20 pounds of DOMINO No. 13 dark brown sugar plus 1 pound, equal to 5 percent, by weight, of the dark brown sugar component, of an edible bond and tack-reducing agent in the form of a water-insoluble microcrystalline cellulose known as AVICEL.

EXAMPLE NO. 13

The same procedure was followed as in example No. 1 above except that in this instance there was employed 20 pounds of DOMINO No. 13 light brown sugar and 0.6 pound of the edible tack and bond-reducing agent, in the form of 200 BW cellulose equal to 3 percent, by weight, of the light brown sugar component.

EXAMPLE NO. 14

The same procedure was followed as in example No. 13, except that in place of the DOMINO light brown sugar, as employed in example No. 13, an equal quantity of C & H light brown sugar was employed.

EXAMPLE NO. 15

The same procedure was followed as in example No. 1 above except that in this instance 20 pounds of DOMINO No. 13 light brown sugar, and 1.2 pound of the edible bond and tack-reducing agent, in the form of BW 200 cellulose, equal to 6 percent by weight, of the brown sugar component, were employed.

EXAMPLE NO. 16

The same procedure was followed as in example No. 15, except that in place of the DOMINO light brown sugar employed in example No. 15, an equal quantity of C & H light brown sugar was employed

EXAMPLE NO. 17

The same procedure was followed as in example No. 1 except that in this instance 20 pounds of JACK FROST light brown sugar and 0.6 pound of the edible tack and bond-reducing agent, in the form of 200 BW cellulose, equal to 3 percent, by weight, of the light brown sugar component, were employed in place of the materials, specified in example No. 1.

EXAMPLE NO. 18

The same procedure was followed as in example No. 1 except that in this instance 20 pounds of JACK FROST light brown sugar and 1.2 pound of the edible tack and bond-reducing agent, in the form of 200 BW cellulose, equal to 6 percent, by weight, of the light brown sugar component, were employed in place of the materials specified in example No. 1.

EXAMPLE NO. 19

The same procedure was followed as in example No. 1 above except that in this instance 2 pounds of the edible tack and bond-reducing agent were employed, equal to 10 percent, by weight, of the dark brown sugar component.

EXAMPLE NO. 20

In this instance the same procedure was followed as in the foregoing example No. 1 except that 5 pounds of C & H yellow (dark) brown sugar was employed with 0.6 pound of an edible tack and bond-reducing agent in the form of BW 200 cellulose, equal to 12 percent, by weight, of the brown sugar component.

EXAMPLE NO. 21

The same procedure was followed as in the foregoing example No. 1 except that in this instance 5 pounds of C & H golden C (light) brown sugar was employed with 0.4 pound of an edible tack and bond-reducing agent in the form of BW 200 cellulose, equal to 8 percent, by weight, of the brown sugar component.

EXAMPLE NO. 22

In this example, 25 pounds of Colonial light brown sugar were intimately mixed, in accordance with the procedure set forth in example No. 1 with 0.75 pounds of finely divided tack and bond-reducing agent in the form of BW 200 wood cellulose, equal to 3 percent, by weight, of the light brown sugar component.

EXAMPLE NO. 23

In this example, 25 pounds of Colonial light brown sugar were intimately mixed, in accordance with the procedure set forth in example No. 1 with 1.25 pounds of finely divided tack and bond-reducing agent in the form of BW 200 wood cellulose, equal to 5 percent, by weight, of the light brown sugar component.

EXAMPLE NO. 24

In this example, 25 pounds of Colonial light brown sugar were intimately mixed, in accordance with the procedure set forth in example No. 1, with 1.75 pounds of finely divided tack and bond-reducing agent in he form of BW 200 wood cellulose, equal to 7 percent, by weight, of the light brown sugar component.

EXAMPLE NO. 25

In this example, 25 pounds of Colonial dark brown sugar were intimately mixed, in accordance with the procedure set forth in the foregoing example No. 1, with 0.75 pounds of finely divided edible tack and bond-reducing agent in the form of BW 200 wood cellulose, equal to 3 percent, by weight, of the dark brown sugar component.

EXAMPLE NO. 26

In this example, 25 pounds of Colonial dark brown sugar were intimately mixed, in accordance with the procedure set forth in the foregoing example No. 1, with 2 pounds of finely divided edible tack and bond-reducing agent in the form of BW 200 wood cellulose, equal to 8 percent, by weight, of the dark brown sugar component.

EXAMPLE 27

In this example, 25 pounds of Colonial dark brown sugar were intimately mixed, in accordance with the procedure set forth in the foregoing example No. 1, with 3 pounds of finely divided edible tack and bond-reducing agent in the form of BW 200 wood cellulose, equal to 12 percent, by weight, of the dark brown sugar component.

EXAMPLE NO. 29

The same procedure was followed as in the foregoing example No. 1 except that in this instance a mixture of 5 pounds of C & H yellow (dark) brown sugar and 0.6 pound, equal to 12 percent, by weight, of the brown sugar component of BW cellulose, was diffused and commingled and subsequently reduced in size and being finely ground in a Model No. 5 Mikroatomizer. The resulting product was approximately 325 mesh and is useful as dusting sugar for toast, and similar uses, and has an excellent flavor.

All of the brown sugars of the various manufacturers, as referred to above, vary substantially in he percentage of invert sugar present therein, and resulting tackiness, and this fact has to be considered in electing a suitable formula or composition for a particular purpose.

EXAMPLE NO. 29

Two hundred pounds of bagged brown or so-called "soft" sugar, of a type known as C and H yellow D, (a dark brown sugar), were worked through a ½ inch mesh screen so as to break up the lumps in the bagged brown sugar with which was mixed, in accordance with the procedure set forth in example No. 1 above, 20 pounds of a tack and bond-reducing agent in the form of a finely divided edible cellulose having a 200 mesh screen size, equal to 10 percent, by weight, of the brown sugar component. To the mixture thus was added, by spraying, 30 pounds of butter oil melted, by heating to a temperature of 120° F, to provide 15 percent, by weight, of butter oil, relative to the weight of the brown or "soft" sugar component of the finished product, whereupon the butter oil was blended into the mixture thus prepared in a ribbon blender for a period of about 12 minutes after adding the butter oil.

The resulting brown sugar edible cellulose-butter oil product thus prepared has a distinct flavor due to its brown sugar and butter oil content and is particularly useful as a baked food product topping, and for other purposes, and will not lump or agglomerate but because of its high butter fat content it may tend to smear somewhat if and when it is processed with other materials.

However, in place of the butter oil employed in the foregoing example No. 29 equivalent amounts of other edible flavoring fats, oils or shortenings may be used, such, for example as oleomargarine, sesame seed oil, olive oil, or the like, and the quantities thereof employed may be varied considerably, depending upon the degree of extent of flavoring desired in the resulting product.

EXAMPLE NO. 30

Two hundred pounds of bagged brown or so-called "soft" sugar of a type known as DOMINO No. 13 dark brown sugar were worked through a ½ inch mesh screen so as to break up the lumps in the bagged brown sugar. The moisture content of the dark brown sugar thus employed was about 3.6 percent, by weight. To the dark brown sugar thus treated 4.8 pounds of water were added, thereby increasing the moisture content of the dark brown sugar to approximately 5.5 percent, (a loss of approximately one-half of 1 percent in the moisture content being due to evaporation and handling). To this was added, in accordance with the procedure set forth in example No. 1, 20 pounds of the aforesaid finely divided edible fibrous water-insoluble wood cellulose, equal to 10 percent, by weight, of the brown sugar component of the resulting product.

In commercial practice this example would be carried out by stopping the withdrawal of the natural moisture content of the brown sugar, under vacuum pan, or centrifuge, or like operation, when the moisture content of the brown sugar component had been reduced to about 5.5 percent. In this manner it is possible, in the practice of the present invention, to utilize brown sugars having a higher syrup and moisture content than has been possible heretofore, and this is advantageous where it is desirable to employ a brown sugar having a high syrup content and resulting distinctive flavor and aroma such, for example, as in certain cake mixes, such as ginger bread cake mixes, and the like.

In the practice of one phase of the present invention, I have found that a highly satisfactory, efficient and economical form of the new finely divided edible tack and bond-reducing component, in the form of edible sugar cane cellulose, may be prepared or recovered from sugar cane or bagasse in accordance with the following example:

EXAMPLE NO. 31

Two pounds of sugar cane stalks are cut, in any suitable manner, as by means of a jig saw tool, into suitable lengths such, for example, as ¼ inch pieces or discs. Cold water is then added to a Waring blender and a portion of the cutup sugar cane stalk material is then added to the blender and mashed and blended for a period of about 60 seconds, whereupon the slurry thus formed is dumped into a cooking pot. This operation is repeated by the addition of cold water and cutup sugar cane stalk material to the Waring blender until 13 pints of cold water have been added to the Waring blender and all of the cutup sugar cane stalk material has been ground up. The slurry of water and sugar cane stalk material thus formed is then cooked for 20 minutes in water at boiling temperature, whereupon the material thus treated is removed and washed with cold water on a 40 mesh screen, then dried for 16 hours at a temperature of 120° F., preferably on steel trays in an electric oven. The product at this point resembles sawdust in appearance, and is in approximately ¼ inch lengths depending upon the length of the pieces as initially made from the sugar cane stalk and then pulverized in the No. 5 Mikroatomizer (See Example No. 28).

The procedure referred to in the foregoing example No. 31 for cutting the sugar cane stalks into suitable small lengths is merely illustrative of many ways in which the sugar cane stalks may be finely divided including shredding, crushing, chopping and the like.

The new edible cellulose product thus prepared or recovered from sugar can stalks may be employed as a bond and tack-reducing agent for use with brown or so-called "soft" sugars, or with other sugar-containing component, as described above, and for other purposes. Thus, typical examples of such brown sugar products prepared in accordance with the present invention, and embodying the new edible cellulose product prepared from sugar cane stalks, are set forth in the following examples.

EXAMPLE NO. 32

Fifty grams of a bond and tack-reducing agent, in the form of the edible cellulose prepared or recovered from the pith and fiber of sugar cane, in accordance with the foregoing example No. 31 are diffused and commingled, as in example No. 1, with 1,000 grams of a brown sugar component in the form of C & H yellow D dark brown sugar, the quantity of edible bond and tack-reducing agent employed in this example being equal to 5 percent, by weight, of the weight of the dark brown sugar component. The resulting product is a free-flowing brown sugar product.

Additional examples of free-flowing brown sugar products made in accordance with the practice of the present invention, and employing the new bond and tack-reducing agent, in the form of the edible cellulose prepared or recovered from sugar cane, in accordance with the foregoing example No. 31, may be prepared in accordance with the following examples:

EXAMPLE NO. 33

Sixty grams of a bond and tack-reducing agent in the form of edible cellulose prepared or recovered from the pith and fiber of sugar cane, in accordance with the foregoing example No. 31, are diffused and commingled, as in example No. 1, with 1,000 grams of a brown sugar component in the form of DOMINO dark brown sugar No. 13, the quantity of the edible bond and tack-reducing agent employed in this example being equal to 6 percent, by weight, of the dark brown sugar component. The resulting product is a free-flowing brown sugar product.

EXAMPLE NO. 34

Seventy grams of a bond and tack-reducing agent in the form of edible cellulose prepared or recovered from the pith and fiber of sugar cane, in accordance with the foregoing example No. 31, are diffused and commingled, as in Example No. 1, with a brown sugar component in the form of 1,000 grams of C & H yellow D dark brown sugar, the quantity of the bond and tack-reducing agent employed in this example being equal to 7 percent, by weight, of the dark brown sugar component. The resulting product is a free-flowing brown sugar product.

EXAMPLE NO. 35

One hundred grams of a bond and tack-reducing agent in the form of edible cellulose prepared or recovered from the pith and fiber of the sugar cane, in accordance with the foregoing example No. 31 are diffused and commingled, as in Example No. 1, with 1,000 grams of brown sugar component in the form of DOMINO dark brown sugar No. 13, the quantity of the edible bond and tack-reducing agent employed in this example being equal to 10 percent, by weight, of the dark brown sugar component. The resulting product is a free-flowing brown sugar product.

EXAMPLE NO. 36

Forty grams of a bond and tack-reducing agent in the form of edible cellulose prepared or recovered from the pith and fiber of sugar cane, in accordance with the foregoing example No. 31, are diffused and commingled, as in example No. 1, with a brown sugar component in the form of 1,000 grams of C & H yellow D dark brown sugar, the quantity of the edible bond and tack-reducing agent employed in this example being equal to 4 percent, by weight, of the dark brown sugar component. The resulting product is a free-flowing brown sugar product.

EXAMPLE NO. 37

Seventy grams of a bond and tack-reducing agent in the form of edible cellulose prepared or recovered from the pith and fiber of sugar cane, in accordance with the foregoing example No. 31, are diffused and commingled, as in example No. 1, with a brown sugar component in the form of 1,000 grams of JACK FROST dark brown sugar, the quantity of the bond and tack-reducing agent employed in this example being equal to 7 percent, by weight, of the dark brown sugar component. The resulting product is a free-flowing brown sugar product.

EXAMPLE NO. 38

Sixty grams of a bond and tack-reducing agent in the form of edible cellulose prepared or recovered from the pith and fiber of sugar cane, in accordance with the foregoing example No. 31, are diffused and commingled, as in example No. 1, with a brown sugar component in the form of 1,000 grams of C & H yellow D dark brown sugar, the quantity of the bond and tack-reducing agent employed in this example being equal to 6 percent, by weight, of the dark brown sugar component. The resulting product is a free-flowing brown sugar product.

EXAMPLE NO. 39

Thirty grams of a bond and tack-reducing agent in he form of edible cellulose prepared or recovered from the pith and fiber of sugar cane, in accordance with the foregoing example No. 31, are diffused and commingled, as in example No. 1, with 1,000 grams of a brown sugar component in he form of DOMINO light brown No. 10 brown sugar, the quantity of the edible bond and tack-reducing agent employed in this example being equal to 3 percent, by weight, of the light brown sugar component. The resulting product is a free-flowing brown sugar product.

EXAMPLE NO. 40

Fifty grams of a bond and tack-reducing agent in the form of edible cellulose prepared or recovered from the pith and fiber of sugar cane, in accordance with the foregoing example No. 31, are diffused and commingled, as in example No. 1, with a brown sugar component in the form of 1,000 grams of DOMINO light brown No. 10 brown sugar, the quantity of the edible bond and tack-reducing agent employed in this example being equal to 5 percent, by weight, of the light brown sugar component. The resulting product is a free-flowing brown sugar product.

EXAMPLE NO. 41

Sixty grams of a bond and tack-reducing agent in the form of edible cellulose prepared or recovered from the pith and fiber of sugar cane, in accordance with the foregoing example No. 31, are diffused and commingled, s in example No. 1, with 1,000 grams of a brown sugar component in the form of DOMINO light brown No. 10 brown sugar, the quantity of the edible bond and tack-reducing agent employed in this example being equal to 6 percent, by weight, of the light brown sugar component. The resulting product is a free-flowing brown sugar product.

EXAMPLE NO. 42

SEventy grams of a bond and tack-reducing agent in the form of edible cellulose prepared or recovered from the pith and fiber of sugar cane, in accordance with the foregoing example No. 31, are diffused and commingled, as in example No. 1, with 1,000 grams of a brown sugar component in the quantity in the form of DOMINO light brown No. 10 brown sugar, the quantity of the edible bond and tack-reducing agent employed in this example being equal to 7 percent, by weight, of the light brown sugar component. The resulting product is a free-flowing brown sugar product.

EXAMPLE NO. 43

In this example, 25 pounds of Colonial light brown sugar were intimately mixed, in accordance with the procedure set forth in example No. 1, with 0.75 pounds of sugar cane cellulose, prepared in accordance with the foregoing example No. 31, equal to 3 percent, by weight, of the light brown sugar component.

EXAMPLE NO. 44

In this example, 25 pounds of light brown sugar were intimately mixed, in accordance with the procedure set forth in the foregoing example No. 1, with 1.25 pounds of sugar cane cellulose, prepared in accordance with the foregoing example No. 31, equal to 5 percent, by weight, of the light brown sugar component.

EXAMPLE NO. 45

In this example, 25 pounds of light brown sugar were intimately mixed, in accordance with the procedure set forth in the foregoing example No. 1, with 1.75 pounds of sugar cane cellulose, prepared in accordance with the foregoing example No. 31, equal to 7 percent, by weight, of the light brown sugar component.

EXAMPLE NO. 46

In this example, 25 pounds of dark brown sugar were intimately mixed, in accordance with the procedure set forth in the foregoing example No. 1, with 0.75 pounds of sugar cane cellulose, prepared in accordance with the foregoing example No. 31, equal to 3 percent, by weight, of the dark brown sugar component.

EXAMPLE NO. 47

In this example, 25 pounds of dark brown sugar were intimately mixed, in accordance with the procedure set forth in the foregoing example No. 1, with 2 pounds of sugar cane cellulose, prepared in accordance with the foregoing example No. 31, equal to 8 percent, by weight, of the dark brown sugar component.

EXAMPLE NO. 48

In this example, 25 pounds of dark brown sugar were intimately mixed, in accordance with the procedure set forth in the foregoing example No. 1, with 3 pounds of sugar cane cellulose, prepared in accordance with the foregoing example No. 31, equal to 12 percent, by weight, of the dark brown sugar component.

It will thus be noted that in the practice of those phases of the present invention which are set forth in the foregoing examples, and employing brown sugars as received in bags from the refineries, the optimum ranges for the brown sugar component and of the edible tack and bond-reducing additive are from 3 percent to 12 percent of the additive, by weight, of the brown sugar component, in the case of DOMINO and C and H dark brown sugars, and from 3 percent, to 8 percent, of the additive, by weight, of the brown sugar component, in the case of the light brown sugar products of the same producers; from 7 to 10 percent of the additive, by weight, of the brown sugar component, in the case of dark brown sugar product of JACK FROST; from 3 to 6 percent of the additive, by weight, of the brown sugar component, in the case of light brown sugar products; from 3 to 7 percent of the additive, by weight, of the light brown sugar component and from 3 to 12 percent of the additive, by weight, in the case of the dark brown sugar component in the case of the brown sugars.

Figure 2:
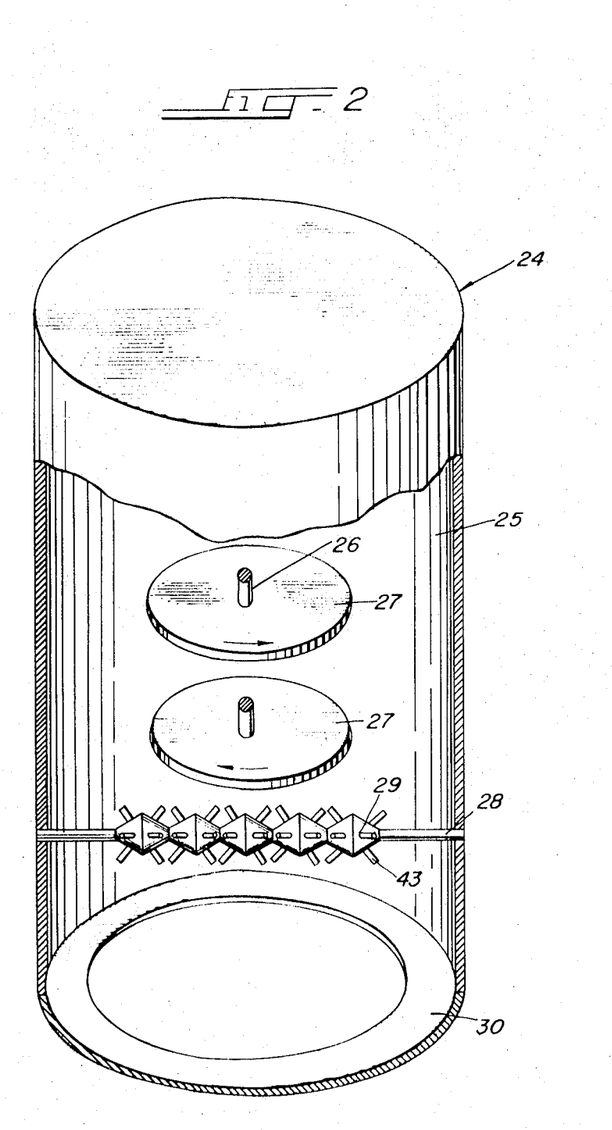
FIG. 2 is a schematic illustration, partly in section of another form of typical apparatus, in the form of vertical mixing tower, which may be employed in the practice of the present invention, in place of the apparatus illustrated in FIG. 1.
Figure 3:
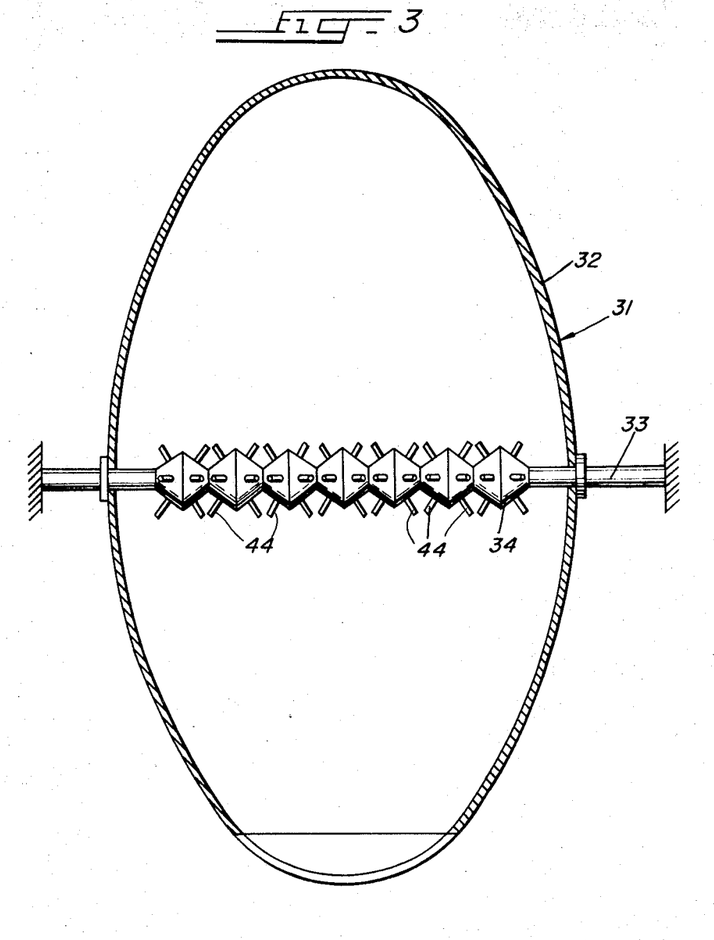
FIG. 3 is a schematic vertical sectional view of another form of typical apparatus in the form of a rotating drum-type mixer which may be employed in place of the apparatus illustrated in FIG. 1.
Figure 4:
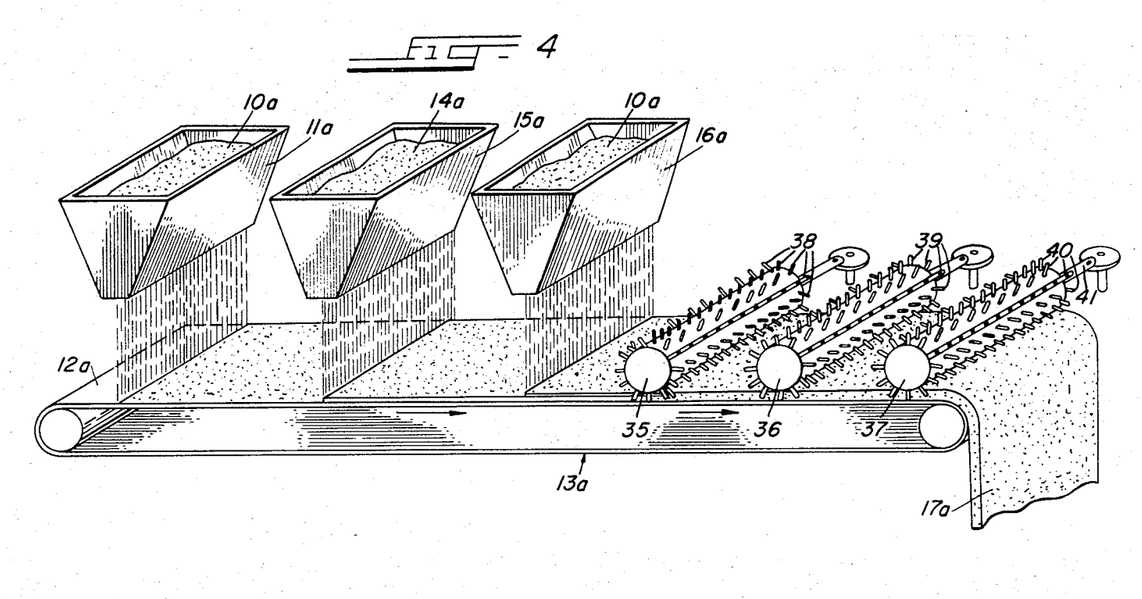
FIG. 4 is a schematic illustration of another embodiment of the mixing apparatus shown in FIG. 1, and which may be employed in the practice of the present invention.

Other apparatus which may be used for diffusing and commingling the additive of the sugar component of the new sugar products, in the absence of any significant pressure, are illustrated diagrammatically in FIGS. 2, 3 and 4 of the drawings. Thus, in FIG. 2 there is illustrated diagrammatically a mixing tower 24 including a generally cylindrical body 25 in which a vertically extending shaft 26 is mounted, this shaft 26 having disc-shaped members 27 arranged thereon at vertically spaced intervals. A horizontally extending shaft 28 is provided in the housing 25 and has breaker bars 29 thereon which are provided with a plurality of fingers 43 arranged at suitably spaced intervals radially therearound, these fingers 43 being of any desired shape and configuration and being shown as being rectangular in shape.

In the use of the diffusing and commingling apparatus illustrated in FIG. 2, the sugar component and the additive may be diffused and commingled by being deposited separately in the upper portion of the body 25 of the mixing tower 24 and allowed to cascade downwardly therethrough onto the rotating disc-shaped plates 27, and they will be diffused and commingled as they fall by gravity from the rotating discs 27 which will be rotated by the shaft 26; and the diffusing and commingling action will be increased by the breaker bars 29 and fingers 43 on the shaft 28, whereupon the thus diffused and commingled components of the new sugar product may be allowed to drop into the base 20 of the tower 24–25 from which they may be removed for packaging or further processing in any suitable manner.

Another form of apparatus which may be used in the practice of the invention is illustrated schematically in FIG. 3 of the drawings in which a rotating tumbler 31 is illustrated and a generally egg-shaped body or housing 32 which is mounted on a rotatable horizontal shaft 33 on which breaker bars 34 are mounted within the body of the housing 32. Each of these breaker bars 34 is provided with a plurality of fingers 44 arranged at suitably spaced intervals radially therearound, and may be of my any desired shape and configuration and are shown as being rectangular in form. In the use of this form of apparatus the components of the new sugar product may be added to the interior of the housing body 32 and as the latter is rotated they will be diffused and commingled by being thrown by centrifugal force off the breaker bars 34 and fingers 44, whereupon the thus diffused and commingled mixture may be removed from the housing for packaging, in any suitable manner.

Another embodiment of the apparatus shown in FIG. 1 which may be used in the practice of the resent invention is illustrated schematically in FIG. 4 of the drawings, and since this form of apparatus is substantially similar to the form of apparatus illustrated in FIG. 1 of the drawings, the same reference numerals have been applied to those parts of the apparatus shown in FIG. 4 which are similar to or comparable to corresponding parts of the apparatus illustrated in FIG. 1, followed by the additional and distinguishing reference character "a".

The form of apparatus illustrated in FIG. 4 is substantially similar to that illustrated in FIG. 1 except that in the form of apparatus shown in FIG. 4, three horizontally extending rotating and oscillating shafts 35, 36 and 37 are mounted above the upper run 12a of the endless conveyor 13a, forwardly of the hoppers 11a, 15a and 16a, relative to the direction of travel of the upper run 12a of the endless conveyor. Each of these shafts 35, 36 and 37, has a plurality of radially extending fingers or fingerlike projections 38, 39 and 40, respectively, thereon.

In the use of the form of apparatus illustrated in FIG. 4, the additive or additives component 10a may be deposited from the hopper 11a on the upper run 12a of the endless conveyor 13a, and the sugar component 14a deposited from the hopper 15a, on the diffused additive component 10a which has previously been deposited on the upper run 12a of the endless conveyor. An additional quantity of the additive component 10a may then be deposited from the hopper 16a on the diffused additive and sugar components 10a–14a, previously deposited on the upper run 12a of the endless conveyor 13a. As the upper run 12a of the endless conveyor 13a then carries the diffused additive and the sugar component forwardly to said components pass under the rotating and oscillating shafts 35, 36 and 37, and are engaged by the radially extending fingerlike projections 38, 39 and 40 thereon which initiate the commingling of the additive and sugar components, as illustrated in FIG. 1 of the drawings. It will be noted, in this connection, that the commingling action which is initiated by the rotating and oscillating shafts 35, 36 and 37 and attached radially extending fingerlike projections 38, 39 and 40 is substantially free of any pressure on the additive and sugar components of the mixture.

In the practice of the present invention the brown sugar component and the edible tack and bond-reducing agent may be diffused and commingled in he absence of any substantial degree of pressure or compacting in other ways and by other apparatus and other arrangements than those which are illustrated diagrammatically in the drawings such, for example, as by means of vertical towers through which the brown sugar component may be caused to cascade onto a vertical inclined trough and be commingled with the edible tack and bond-reducing agent as the brown sugar travels downwardly therein, or by means of gently moving drums or churns of the butter type, or by mixers which are conical in shape, or by means of conveyors consisting of traveling trays, or by means of a so-called Vibra-Static Machine such as is used to apply flock to sheets, fabrics, etc.

In addition to the procedure set forth in the foregoing examples Nos. 1 to 48, inclusive, the new brown sugar product may be subjected to one or more various optional treatments or procedures, as suggested in step 5, (FIG. 1). Certain of such additional optional treatments or procedures are set forth in the following examples:

EXAMPLE NO. 49

The same procedure was followed as in example No. 1 above except that in this instance 20 pounds of DOMINO No. 13 dark brown sugar were mixed with 1 pound, equal to 5 percent, by weight, of the brown sugar component of BW 200 cellulose. The moisture content of the mixture at the end of the commingling operation was 3.4 percent. However, additional moisture was incorporated in the diffused and commingled mixture by means of a spray gun, employing a pressure of 80 pounds per square inch, and 200 cc. of ambient temperature water were atomized upon the mixture spread out upon a flat surface. The mixture thus treated was gently tumbled after the atomizing operation. The moisture content at the end of the thus moistened new brown sugar product at the end of this operation was 4.9 percent, by weight.

EXAMPLE NO. 50

The same procedure was followed as in example No. 1 above, except that in this instance 25 pounds of C and H tacky dark brown sugar having a moisture content of 3.8 percent, and 2.25 pounds of an edible tack and bond-reducing agent in the form of BW 200 cellulose, equal to 9 percent of the dark brown sugar component, by weight, were first diffused and commingled, as in example No. 1 above. The moisture content of the dark brown sugar component at the end of the diffusing and commingling operation was approximately 3.6 percent. To 20 pounds of the diffused and commingled mixture of the dark brown sugar component and the edible tack and bond-reducing agent, thus prepared, were then added 3 pounds of butter oil, equal to 15 percent of the aforesaid mixture, by weight, at a temperature of 120° F. The butter oil component employed consists of the fat of butter remaining after the water content of the butter has been removed from the butter. The resulting brown sugar product thus formed was a relatively free-flowing brown sugar product, of excellent aroma, texture and color, and with the moisture content of the brown sugar component being approximately that of the tacky brown sugar component as initially employed.

In the practice of the invention, as set forth in the foregoing example No. 50, the butter oil may be sprayed onto the diffused and commingled mixture of the brown sugar component and the edible tack and bond-reducing agent, as the aforesaid mixture is moved along an endless conveyor, as 13, as indicated at Step 5 in FIG. 1 of the drawings. X

EXAMPLE NO. 51

In this instance the same procedure was followed as set forth in example No. 50 above, except that the brown sugar component consisted of 25 pounds of C and H tacky light brown sugar diffused and commingled with 1.75 pounds of an edible tack and bond-reducing agent in the form of BW 200 cellulose, equal to 7 percent, by weight, of the brown sugar component. After these materials had been diffused and commingled, as in example No. 1 above, 3 pounds (equal to 15 percent), by weight, of the diffused and commingled mixture of the brown sugar component and the edible tack and bond-reducing agent) of a vegetable margarine oil (Mazola brand) was applied to the aforesaid mixture at a temperature of 125° F. by spraying the oil onto the diffused and commingled mixture of the brown sugar component and the edible tack and bond-reducing agent, as the mixture moved along the endless conveyor, as 13, as illustrated at step 5 in FIG. 1 of the drawings.

The brown sugar—edible cellulose butter oil product of the foregoing example No. 50, and the comparable margarine oil product of example No. 51, have distinct flavors and are particularly useful as a baked food topping, and for other purposes.

In place of the butter oil and margarine oil referred to in the foregoing examples Nos. 50 and 51, other equivalent edible flavoring fats, oils or shortenings, such, for example, as sesame oil, olive oil, and the like, may be substituted in place thereof, as in example No. 29, and the quantities of such edible flavoring fats, may be varied depending upon the degree of flavoring, aroma, etc., desired in the resulting product.

In one aspect thereof the new brown sugar products and the new method of making the same have distinct advantages and among these are (1) the new method of making the new brown sugar products enables the relatively lighter edible tack and bond-reducing agent or agents to be intimately mixed or commingled with the relatively heavier brown sugar component in such a manner that the practice of the edible tack and bond-reducing agent or agents are commingled with and encircle or envelop the heavier particles or the sticky brown sugar component while both components are in a diffused condition and in the absence of any substantial pressure; (1) it requires relatively low levels or quantities of the edible tack and bond-reducing agent with the result that the percentage of the edible tack and bond-reducing agent which is required for incorporation in the brown sugar component is materially reduced; (3) it makes possible the advantageous use of the new edible tack and bond-reducing component prepared from sugar cane stalks and also the advantageous use of the other edible tack and bond-reducing agents or additives herein disclosed which cannot be employed with other methods; (4) it generates relatively little heat or friction during the operation of mixing the brown sugar component or a mixture of brown sugar components, and the edible tack and bond-reducing agent; (5) it develops very little shear or at least a localized shear in the system during the mixing operation; (6) it develops very little smear during the mixing of the brown sugar component, or a mixture of brown sugar components, and the edible tack and bond-reducing agent, thereby minimizing the necessity for washing the mixing equipment; (7) it develops relatively little pressure between the two phases of the materials or components during the time they are being diffused or during the time they are being commingled; (8) it avoids the twisting motion of typical rotating shaft mixers which cause "pilling" or balling up of the components of the mixture; (9) it allows for aeration of the new brown sugar product during the mixing operation since the surface areas of the components which are exposed to the atmosphere during the mixing operation are relatively great in comparison to the surface areas which are exposed to the atmosphere when mixing such components in ribbon-type blenders where the mass of the materials tends to be compacted or tightly pushed together, it being noted, in this connection that such aeration of the components during mixing thereof is desirable in many instances such, for example, as where the brown sugar component is made from an unusually wet brown sugar or from an unusually hot brown sugar; (10) it facilitates the spraying of moisture or other additives into the mixture in addition to the edible tack and bond-reducing agent or agents, if necessary, or desirable, and this is often not feasible or practical in the use of conventional mixing equipment; (11) it enables the use of the relatively water-insoluble edible bond and tack-reducing components hereinbefore disclosed and which have an extremely large surface area which possess the property of eliminating or at least substantially reducing the tackiness of the tacky brown sugar components of the new sugar products; (12) it may be employed practically in an atmosphere of relatively high or low humidity and under either vacuum or under pressure; (13) the resulting brown sugar products are free-flowing, nonsmearing, and noncaking; and 14) by reason of the fact that the new brown sugar products contain the natural moisture content of the brown sugar component thereof it does not require drying for the removal or reduction of the moisture content of the brown sugar component and because thereof the new brown sugar products retain the natural flavor, color and aroma and approximate bulk density of the brown sugar components of the new sugar products; and in another aspect thereof the present invention provides a new and improved edible tack and bond-reducing agent prepared from sugar stalk and a new and improved method of preparing the same.

In the practice of the present invention, as set forth in the foregoing examples, due allowance is made for climatic and atmospheric conditions of temperature, humidity, etc., in which the invention may be practiced or the resulting brown sugar product utilized, and other variable factors as to refinery conditions, skill of personnel, and the like. Thus, for example, in the foregoing example No. 28, the 12 percent additive employed is at a high level for a brown sugar product, in general, but since the particle size is subsequently reduced to 325 mesh the high level of additive is desirable. However, in those instances, where unusually good packaging is available for packaging and storing the new brown sugar product, lower levels of additives are suitable. In addition, if the resulting brown sugar product is to be agglomerated by known agglomerating process techniques, the percentage of the additive employed is desirably chosen to satisfy both he requirements for free flowability of the resulting brown sugar product and the demands of the agglomerating process and apparatus. Moreover, as indicated, the use of a combination of two or more of the edible tack and bond-reducing agents or additives may be desirable under certain circumstances.

In order to assist in the interpretation of the present invention, and the claims hereinafter set forth, certain of the terms as used herein, or as used hereinafter in the claims, may be defined as follows:

1. Diffused

As used herein, and as used hereinafter in the claims, the term "diffused" means that the components employed in making the new sugar or sugar-containing products are spread out over an extended area, without being subjected to any substantial degree of pressure;

2. Commingled

As used herein, and as used hereinafter in the claims, the terms "commingled" and "commingling" mean that the components employed in making the new brown sugar product are brought together and intimately mixed in their diffused state without compacting and in the absence of any substantial degree of pressure or shear;

3. Nonsmearing

For the purpose of determining what is considered to be "nonsmearing," within the scope and contemplation of the present invention, I use the measure of the weight of a flat aluminum paddle of a Kitchenaid (Hobart) mixer, a typical one of which weights 120 grams, and into the bowl of the mixer I place 1,000 grams of the brown sugar component and mix it for a period of 5 minutes. The paddle is weighted before mixing and after mixing and the greater the smearing action in the system the more the paddle will weigh after mixing. This, some relatively large lumps will cling to the paddle and the paddle is tapped once after removing it from the mixer and those parts of the product which cling to the paddle constitute the weight of the "smeared on" product. Thus, if the weight of the product clinging to the paddle in the example given is not in excess of 1 to 2 grams, the resulting brown sugar product is considered to be "nonsmearing."

4. Tack

By the term "tack" or "tacky" as used hereinbefore, and as used hereinafter in the claims, in reference to the tacky food component of the new food product and in reference to the edible bond and tack-reducing agent, is meant that quality of characteristic thereof which is given in Webster's Third New International Dictionary, G. & C. Merriam Company, 1961 Ed. (page 2326) where this term is defined, in part, as follows: "the quality or state of sticking or adhering: adhesiveness, stickiness: the property of raw rubber or compounded rubber stock of adhering firmly when layers are pressed together"

5. Bond

By the term "bond" as used hereinbefore, and as used hereinafter in the claims, in reference to the edible bond and tack-reducing agent, is meant that quality or characteristic thereof which is given in Webster's Third New International Dictionary, G. & C. Merriam Company, 1961 Ed. (page 250) where this term is defined, in part, as follows: "to hold together in a molecule or crystal by means of chemical bonds: to hold together or solidify by or as if by means of a bond or a binder; specif: to cohere (as the fibers in paper, the coating of the surface of paper, the elements in laminated board)."

It will thus be seen from the foregoing description, considered in conjunction with the accompanying drawings, that the present invention provides a new and improved brown sugar products and a new and improved method of making the same, and thus has the desirable advantages and characteristics and accomplishes its intended objects including those hereinbefore pointed out and others which are inherent in the invention.

I claim:

1. The method of making an edible brown sugar product which comprises diffusing a tacky solid crystalline brown sugar component having a moisture content of not less than about 2 percent, diffusing a quantity of a finely divided edible bond and tack-reducing component selected from the group consisting of finely divided water-insoluble edible wood cellulose, microcrystalline cellulose, and sugar cane cellulose, and then bringing the diffused tacky solid crystalline brown sugar component and the diffused finely divided edible bond and tack-reducing component together and commingling them in their diffused condition in quantities within a range of from not substantially less than 3 percent nor substantially more than 12 percent, by weight, of the edible bond and tack-reducing component relative to the quantity of the tacky solid crystalline brown sugar component to form an intimate mixture thereof and without removal of the aforesaid moisture content of the tacky solid crystalline brown sugar component and without subjecting the mixture of the tacky solid crystalline brown sugar component and the finely divided edible bond and tack-reducing component to any substantial degree of pressure.

2. The method of making an edible brown sugar product as defined in claim 1 which includes the step of incorporating in the mixture thus prepared an edible flavoring material selected from the group consisting of edible flavoring fats and oils.

* * * * *